(12) United States Patent
Ewel

(10) Patent No.: US 10,160,428 B2
(45) Date of Patent: Dec. 25, 2018

(54) TRAILER BREAK-AWAY SWITCH

(71) Applicant: Dewel, LLC, Mankato, MN (US)

(72) Inventor: David E. Ewel, Mankato, MN (US)

(73) Assignee: DEWEL, LLC, Mankato, MN (US)

( * ) Notice: Subject to any disclaimer, the term of this patent is extended or adjusted under 35 U.S.C. 154(b) by 153 days.

(21) Appl. No.: 15/425,606

(22) Filed: Feb. 6, 2017

(65) Prior Publication Data

US 2017/0225665 A1 Aug. 10, 2017

Related U.S. Application Data

(60) Provisional application No. 62/291,875, filed on Feb. 5, 2016.

(51) Int. Cl.
| | | |
|---|---|---|
| *H01H 45/02* | (2006.01) | |
| *B60T 7/20* | (2006.01) | |
| *B60Q 1/26* | (2006.01) | |
| *B60Q 1/00* | (2006.01) | |

(52) U.S. Cl.
CPC .............. *B60T 7/20* (2013.01); *B60Q 1/0076* (2013.01); *B60Q 1/2696* (2013.01); *H01H 45/02* (2013.01)

(58) Field of Classification Search
CPC ....... B60T 7/20; B60C 1/2696; B60C 1/0076; H01H 45/02
See application file for complete search history.

(56) References Cited

U.S. PATENT DOCUMENTS

| | | |
|---|---|---|
| 3,681,551 A | 8/1972 | Smith |
| 3,907,071 A | 9/1975 | Wells |
| 4,052,695 A | 10/1977 | Myers |
| 4,938,542 A | 7/1990 | Kline et al. |
| 5,346,289 A | 9/1994 | Cords et al. |
| 5,431,253 A | 7/1995 | Hargrove |
| 5,582,275 A | 12/1996 | Arnold |
| 5,779,324 A | 7/1998 | Cords et al. |
| 6,166,516 A | 12/2000 | Albright et al. |
| 6,416,138 B1 | 7/2002 | Barnett |
| 6,626,504 B2 | 9/2003 | Harner et al. |
| 7,114,786 B2 | 10/2006 | Bess et al. |
| 7,463,136 B2 | 12/2008 | Ungerman |
| 7,683,585 B1 | 3/2010 | Johnson et al. |
| 8,215,436 B2 | 7/2012 | DeGrave et al. |
| 9,073,481 B2 | 7/2015 | McCollum |

*Primary Examiner* — Robert Deberadinis

(74) *Attorney, Agent, or Firm* — Merchant & Gould P.C.

(57) ABSTRACT

A trailer break-away switch comprises an electromechanical means to energize a towed trailer brake in the event of unintended decoupling of the trailer from the towing vehicle. When in normal operation, the trailer break-away switch operates as a normally open switch between the stored energy source (the battery) on the trailer and the trailer brake system. In the event of unintended decoupling of the trailer from the towing vehicle, a pin is pulled from the trailer break-away switch, which activates the switch. Activating the switch allows electrical power to be connected to the trailer brake system. In some cases, the switch directly connects a trailer battery to the electromagnetic coils of the electric brakes.

37 Claims, 7 Drawing Sheets

TRAILER BREAK-AWAY SWITCH

CLAIM TO PRIORITY

The present application claims priority to U.S. provisional patent application No. 62/291,875, filed Feb. 5, 2016, and entitled "Trailer Break-Away Switch." The entire content of the identified provisional patent application is hereby incorporated by reference.

FIELD OF THE DISCLOSURE

The present disclosure generally relates to break-away switches and, more particularly, to trailer break-away switches used on trailers to energize the trailer brakes in the event of unintended decoupling of the trailer from a towing vehicle.

BACKGROUND OF THE DISCLOSURE

Braking systems have been used for many years on vehicles such as trucks, trailers and the like. Similarly, break-away switches have been used for many years on trailers to help stop them if they become separated from the towing vehicle. Break-away braking systems have been used for years as shown in U.S. Pat. Nos. 3,907,071 and 4,052,695. These systems typically have an auxiliary battery mounted on the trailer which activates the electric brakes when the trailer breaks-away or becomes separated from the towing vehicle. U.S. Pat. No. 3,681,551 describes a disconnect safety switch used in a break-away braking system.

Known break-away switches suffer from a number of design deficiencies. Presently, break-away switches are mechanical devices that typically use a nonconductive mechanism to mechanically separate the contacts of the switch. When the nonconductive mechanism is removed, the contacts are typically actuated by springs to close the switch contacts. The use of contacts and springs produces undesirable failure modes. Although seals are added in an attempt to keep out contaminates, moisture condensation within the switch housing can cause corrosion of the contacts. The corroded contacts create a high resistance barrier between the contacts that is not removed with the simple closing motion of the contacts. Broken springs that fail to actuate the contacts or contaminates that become lodged between the contacts can also be a problem. All of these failure modes can result in a switch that is electrically ineffective even though its nonconductive mechanism has been removed.

Furthermore, when known break-away switches are submersed in conductive liquid or become contaminated with conductive material between the contacts, the trailer brakes can be inadvertently actuated. This can result in an application of the trailer brakes that can be hazardous.

It would be desirable therefore if there was a break-away switch that could overcome the problems discussed above and would provide the means to actuate the trailer brakes in the event of unintended decoupling of the trailer from the towing vehicle.

SUMMARY

One aspect of the present disclosure makes use of a non-contacting switch to energize the trailer brakes in the event of unintended decoupling of the trailer from the towing vehicle. A field effect transistor ("FET") is activated by a magnetically activated device, such as a Hall effect chip or reed switch, that is embedded in the circuitry. When a ferromagnetic component is in close proximity to the magnetically activated device, the magnetic flux from a permanent magnet is insufficient to turn on the magnetically activated device keeping the FET turned off and the non-contacting switch in its normally open electrical condition. When a ferromagnetic component is removed, flux density from an embedded magnet increases at the magnetically activated device which turns on the FET to create a conductive path from electrical power to the non-contacting switch output wire.

Another aspect of the present disclosure includes a housing that is used to enclose the electronic circuitry and allows a ferromagnetic pin to be inserted in close proximity to both the permanent magnet and the magnetically activated device within the electronic circuitry. The housing has an extrusion that extends through a hole in a bracket. Furthermore, the bracket has a tab that is bent into the confines of the housing so then when the housing is filled with potting to protect the electronics and encapsulate the magnet, the tab becomes embedded in the potting, securing the housing to the bracket.

Still another aspect of the present disclosure includes the bracket having a hole in it, which is used to attach the assembly to a trailer with a fastener. Magnetic force keeps the ferromagnetic pin attached to the assembly under normal operation. A cable assembly attaches to the ferromagnetic pin while its opposite end attaches to a towing vehicle. Should the trailer become decoupled from the towing vehicle, the cable assembly will pull the pin out of the break-away switch housing which will cause the switch to electrically close.

Still another aspect of the present disclosure is an o-ring that is used to keep contaminates from embedding between the ferromagnetic pin and the housing. However, should the o-ring be damaged or removed, the switch continues to function as intended.

Still another aspect of the present disclosure is a light emitting diode (LED) that is used to indicate when the FET is turned on and when the switch is electrically closed. When connected to a power source and the ferromagnetic component removed, the LED will illuminate. This feature allows the switch to be tested by an operator verifying that the switch is functioning properly.

The above summary is not intended to describe each and every aspect, embodiment or implementation of the subject matter of the present disclosure. Rather, a more complete understanding of the subject matter will become apparent and appreciated by referring to the following detailed description and claims in conjunction with the accompanying drawings.

DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
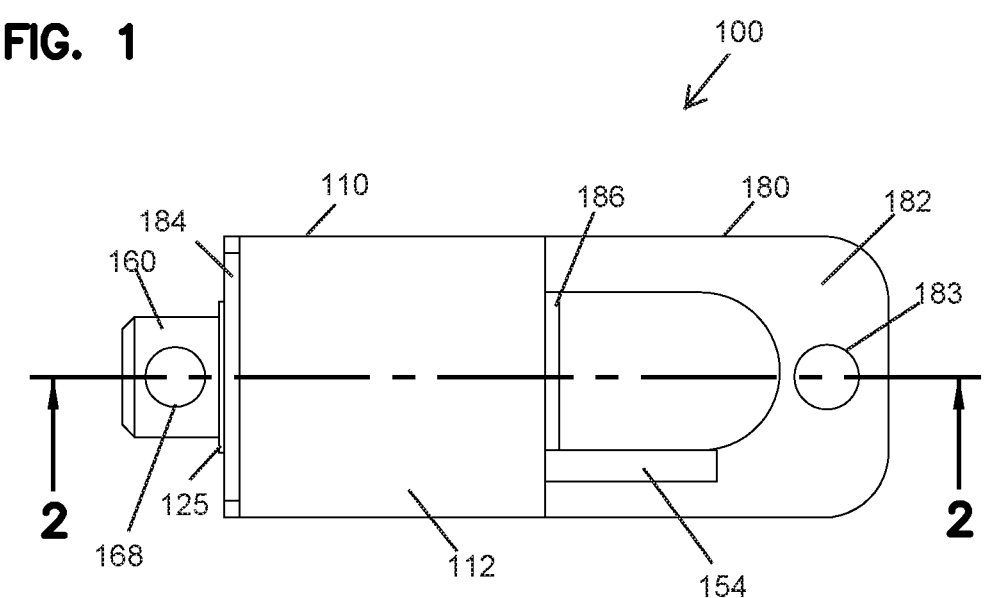
FIG. 1 is a top view of a break-away switch.
Figure 2:
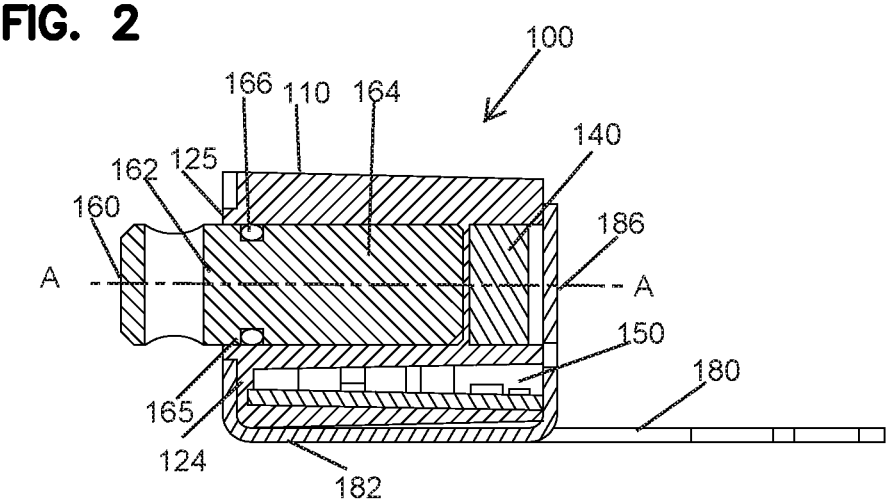
FIG. 2 is a sectional view of the break-away switch taken along line 2-2 of FIG. 1.
Figure 3:
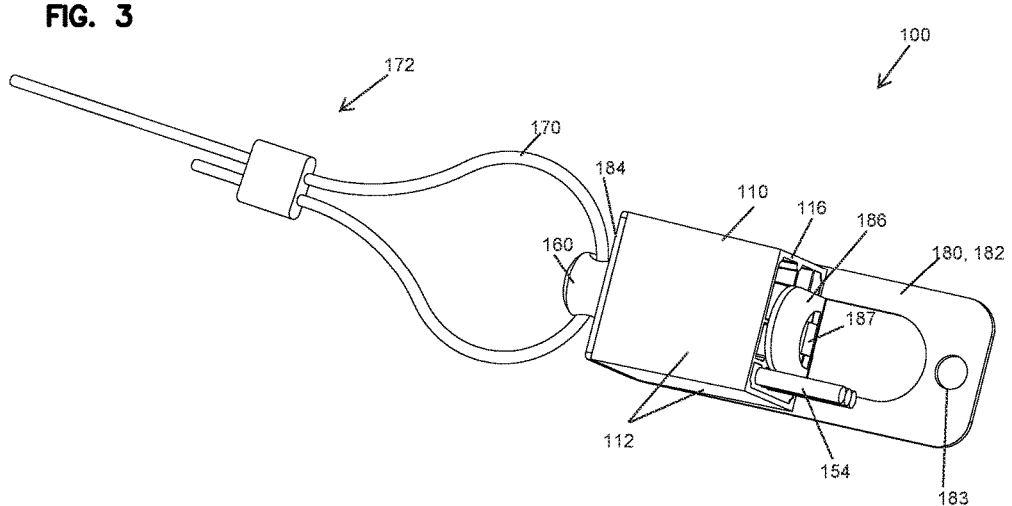
FIG. 3 is an isometric view of a break-away switch assembly.
Figure 4:
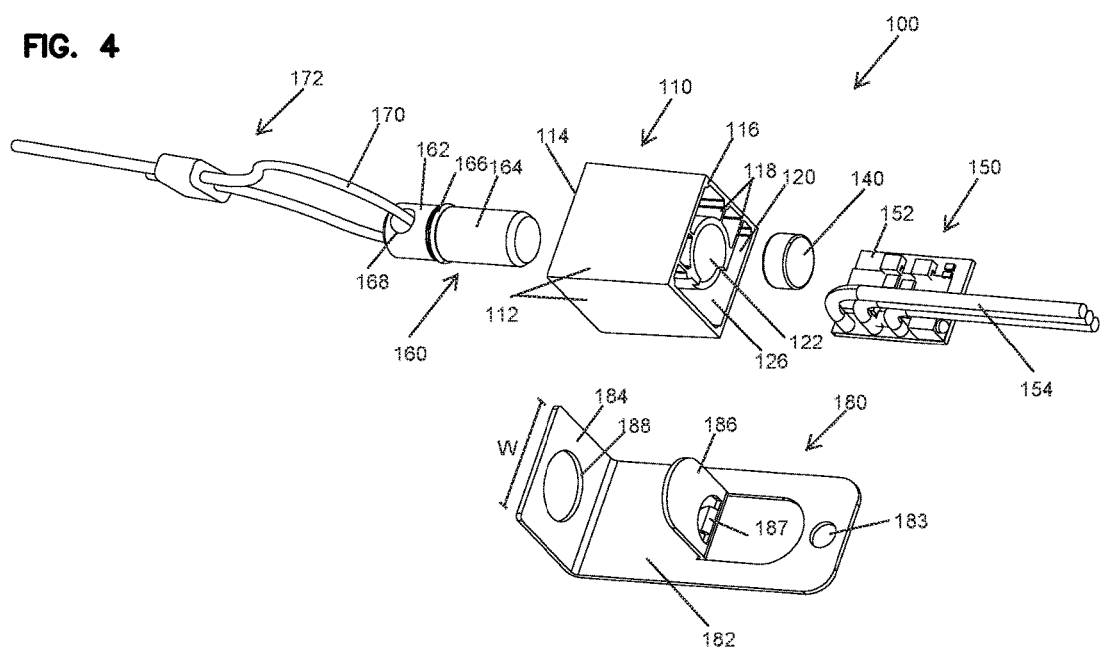
FIG. 4 is an exploded view of a break-away switch assembly.

The present disclosure is directed to trailer break-away switch comprising an electromechanical means to energize a towed trailer brake in the event of unintended decoupling of the trailer from the towing vehicle. When in normal operation, the trailer break-away switch operates as a normally open switch between the stored energy source (the battery) on the trailer and the trailer brake. In the event of unintended decoupling of the trailer from the towing vehicle, a pin is pulled from the trailer break-away switch, which activates the switch. Activating the switch allows electrical power to be connected to the trailer brake. In some cases, the switch directly connects a trailer battery to the electromagnetic coils of the electric brakes.

Referring to FIGS. 1-4, the trailer break-away switch 100 of the present disclosure generally comprises a housing portion 110, which is used to encase a permanent magnet 140 and an electronic circuit assembly 150, a ferromagnetic component 160 and a bracket 180.

As shown, the housing portion 110 of the trailer break-away switch 100 is generally of a rectangular cross-section including four sides 112 extending from a forward face 114 of the housing portion 110 to a rear face 116 of the housing portion. Each of the four sides 112 presents a solid outer surface. Lateral extensions 118 extend from two or more of the inner surfaces 120 of the four sides 112 to support a cylindrical channel structure 122 that extends centrally through the housing portion 110 from the forward face 114 to the rear face 116. A forward face portion 124 substantially encloses the forward face 114 about the open channel structure 122 and provides a housing boss 125 that extends forward from and beyond the forward face portion 124. The lateral extensions 118 of the inner surfaces 120 further define a circuit assembly cavity 126 within the housing portion 110 that is configured to receive and house the electronic circuit assembly 150. The rear face 116 of the housing portion 110 is left open providing assembly access to the channel structure 122 and the circuit assembly cavity 126. It should be noted that while the housing portion 110 has been described as having a rectangular cross-section other cross-section configurations, e.g., square, circular, triangular, hexagonal, etc., may also be used. The channel structure 122 may also comprise a geometrical configuration other than cylindrical. In certain example embodiments, the housing portion 110 is of a unitary construction fabricated through molding of one or more types of polymers.

The permanent magnetic 140 is of a size and shape so as to be received within the channel structure 122 of the housing portion 110. In certain embodiments, the permanent magnet 140 is cylindrical with the north and south poles along the centerline of the channel structure 122. When positioned in place the permanent magnet 140 is maintained at the end of the channel structure 122 of the housing portion 110 proximate the rear face 116. The position of the permanent magnet 140 within the channel structure 122 can be maintained through, for example, use of a potting compound or through insert-molding of the permanent magnet 140 during molding of the housing portion 110.

Figure 5:
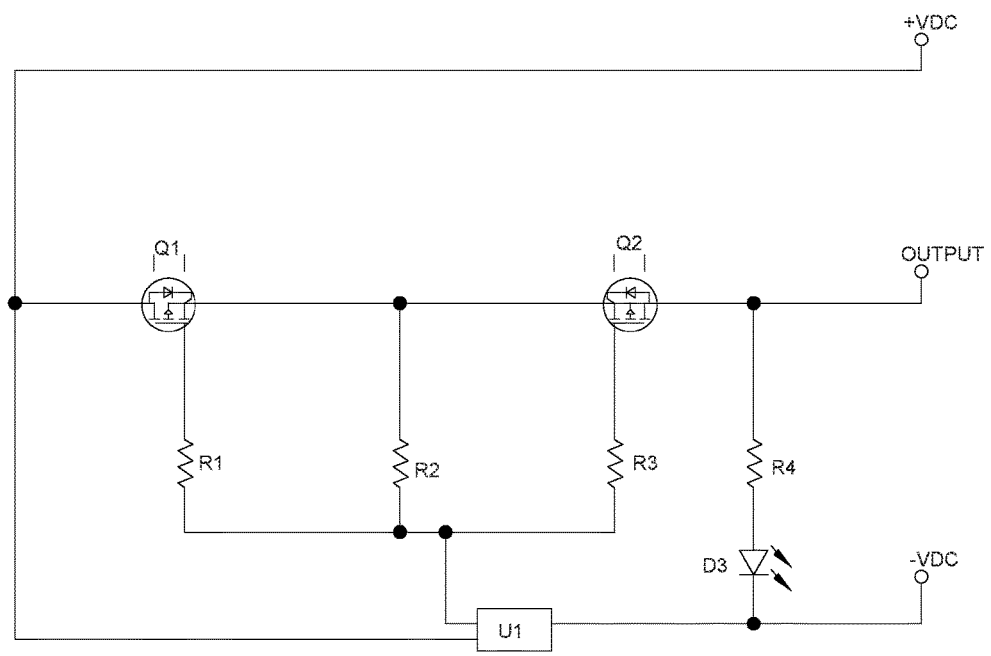
FIG. 5 is an example of a simplified electrical circuit usable in the break-away switch assembly.

The electronic circuit assembly 150 generally includes a circuit board 152, and attached wiring 154, that is configured to be received within the circuit assembly cavity 126. An example configuration of the electronic circuit assembly 150 is illustrated in the simplified schematic of FIG. 5. As shown, the circuit board 152 includes two field effect transistors (FETs) Q1 and Q2, resistors R1, R2, R3 and R4, a magnetically activated switch (e.g., Hall effect sensor switch, reed switch, etc.) U1, and a diode D3. The attached wiring 154 includes three wires +VDC, −VDC and switch output wire, OUTPUT. The attached wiring 154 is configured to exit the housing portion 110 and is further configured for coupling with the electrical braking circuit of a towed trailer or other type of towed vehicle. Note that +VDC and −VDC, are coupled to a battery, or other type of power supply that is provided within the confines of the trailer configuration, to provide positive and negative power, respectively, to the circuit board 152. The OUTPUT is connected to the positive power through Q1 and Q2 when switch U1 is closed. Q1 and Q2 are arranged such that when U1 is open, normal electrical power cannot be transmitted in either direction between the positive power +VDC and the switch output wire, OUTPUT. Further, the design of the circuitry is such that when U1 is turned on, Q1 and Q2 can transmit normal electrical power in either direction between the positive power wire +VDC and the switch output wire, OUTPUT.

Referring once again to FIGS. 1-4, the ferromagnetic component 160 comprises forward portion 162 and a rear portion 164. The rear portion 164 is insertable through the forward face portion 124 of the housing portion 110 and is configured to be received within the channel structure 122. In the example of the FIGS. 1-4, the rear portion 164 is of a cylindrical plug configuration. An o-ring 166 extends about the outer surface of the ferromagnetic component 160 at the intersection of the forward portion 162 and rear portion 164; the combined forward portion 162 and rear portion 164 may be of unitary construction or multi-piece construction. The o-ring 166 operates as a sealing device to establish a seal between the ferromagnetic component 160 and the channel structure 122 when the ferromagnetic component 160 is inserted therein. The o-ring also assists in restricting the removal and insertion of the ferromagnetic component 160 in the channel structure 122 to prevent inadvertent separation of the ferromagnetic component 160 from the housing portion 110. In certain example embodiments, a recess 165 about the ferromagnetic component 160 can be used to place and hold the position of the o-ring 166. The forward portion 162 of the ferromagnetic component 160 is provided with a channel 168 that is transverse to the elongate central axis of the ferromagnetic component 160. The channel 168 is configured to receive a loop end 170 of a cable assembly 172. The other end of the cable assembly 172 is coupled to a towing vehicle in such a way as to assure that the ferromagnetic component 160 is pulled free from the housing portion 110 in the event of unintended decoupling of a trailer from its towing vehicle.

The bracket 180 is of a unitary construction having a bottom plate 182 including one or more mounting holes 183, a forward extending face plate 184, a forward extending rear plate 186 and a tab portion 187. The face plate 184 includes an opening 188 that correspond to the shape of the housing boss 125 of the housing portion 110 and has a width W that corresponds to the width of the bottom plate 182. The rear plate 186 is of a solid configuration and is of a width narrower than the bottom plate 182. The tab portion 187 is bent downward from the bottom plate 182 and away from the rear plate 186. A distance between the bent tab portion 187 and the bottom plate 182 allows sufficient space to accommodate a thickness of one of the side walls 112 of the housing portion 110 enabling the tab portion 187 to hold the housing portion 110 in place relative to the bracket 180. It should be noted that the bracket 180 can be fabricated from a ferromagnetic material, in which case the ferromagnetic bracket conducts magnetic flux from the permanent magnet 140 away from the magnetically activated switch U1 when the ferromagnetic component 160 is in the channel structure 122 of the housing portion. The bracket 180 can, alternatively, be fabricated from a non-ferromagnetic material.

Assembly of the trailer break-away switch 100 includes inserting the circuit board 152 and attached wiring 154 into the circuit assembly cavity 126 of the housing portion 110, and inserting the permanent magnet 140 within the channel structure 122. Potting can be used not only to maintain the desired position of the circuit board 152 and permanent magnet 140 within the housing portion 110 but, as well, to seal and protect the circuit board 152 and permanent magnet 140 from environmental elements. With the electronic circuit assembly 150 and permanent magnet 140 in place, the housing portion 110 can be positioned within the bracket 180 between the face plate 184 and the rear plate 186 with the tab portion 187 of the bracket 180 bent into the confines of the housing portion 110 via the open rear face 116 to assist in holding the housing portion 110 in place. The housing boss 125 of the forward face portion 124 extends into the opening 188 of the face plate 184 of the bracket 180 to further assist in holding the housing portion 110 in position relative to the bracket 180.

With the housing portion 110 secured in place within the bracket 180 by the tab portion 187 and housing boss 125, the rear plate 186 of the bracket 180 is positioned over the open rear face 116 of the housing portion 110 operating to cover the open channel structure 122 yet providing sufficient side space to allow for exit of the attached wiring 154 from the circuit assembly cavity 126. A potting compound can be used to affix one, two or all of the face plate 184, the rear plate 186, and the tab portion 187 of the bracket 180 to the housing portion 110; other manners (e.g., fasteners, adhesives, etc.) of securing the bracket 180 to the housing portion 110 can also be used as appropriate. The rear portion 164 of the ferromagnetic component 160 can then be inserted into the channel structure 122 through the housing boss 125 at the opening 188 in the face plate 184. Complete insertion of the rear portion 164 places an end of the ferromagnetic component 160 proximate the permanent magnet 140. The bracket 180 is mountable to the frame, or other component, of a tow trailer via a screw or other fastener inserted through the mounting hole 183; other manners of fastening the bracket 180 to the tow trailer may also be used. The cable assembly 172 is coupled between the ferromagnetic component 160 and a tow vehicle.

In operation, with the assembled trailer break-away switch 100 mounted on a towed trailer and coupled via the cable assembly 172 to a tow vehicle, the permanent magnet 140 operates to pull the ferromagnetic component 160 toward itself and further operates to keep an attractive force on the ferromagnetic component 160 with sufficient force so as to keep the permanent magnet 140 and the ferromagnetic component 160 magnetically coupled under normal operation of the switch. More specifically, when the ferromagnetic component 160 is inserted in the channel structure 122 of the housing portion 110 and is proximate the permanent magnet 140, the flux density near the magnetically activated switch U1 is reduced turning the magnetically activated switch U1 OFF, which opens Q2 between its drain and source. The magnetically activated switch U1 is positioned such that when the ferromagnetic component 160 is removed from the housing portion 110, e.g. the trailer being towed by a towing vehicle has become disconnected from the towing vehicle causing the cable assembly 172 and attached ferromagnetic component 160 to be pulled free of the housing portion 110 and bracket 180, the flux density through the magnetically activated switch U1 is increased and the magnetically activated switch U1 is turned ON, which turns on Q2 allowing conductivity between the drain and source of Q2. With Q2 turned ON, power is provided from the battery, or other power source, to the electric braking circuit of the trailer causing activation of the electric brakes and slowing of the detached trailer. In certain example embodiments, when the magnetically activated switch U1 is turned ON, power can be supplied to not only the electric braking circuit of the trailer but as well to the light emitting diode (LED) D3 for illumination to indicate that +VDC power is connected to the OUTPUT; resistor R4 can be used to limit the current through D3. LED illumination can be used during a test (e.g., pulling the ferromagnetic component 160 from the housing portion 110 while the trailer is coupled to the towing vehicle) of the trailer break-away switch 100 to ensure that power is being supplied to the switch 100.

In certain example embodiments, the ferromagnetic component 160 is fixedly maintained within the channel structure 122 of the housing portion 110 while the permanent magnet 140 is configured to be the removable element from the housing portion 110, e.g. the cable assembly 172 is coupled between the permanent magnet 140 and the towing vehicle. In this configuration, removal of the permanent magnet from the channel structure of the housing portion 110 causes the magnetically activate switch U1 to change state enabling the delivery of power through Q1 and Q2 to a braking system of a trailer. Further, maintaining the permanent magnet 140 within the channel structure 122 of the housing portion 110 causes the magnetically activated switch U1 to keep Q1 and Q2 open and non-conductive.

Figure 6:
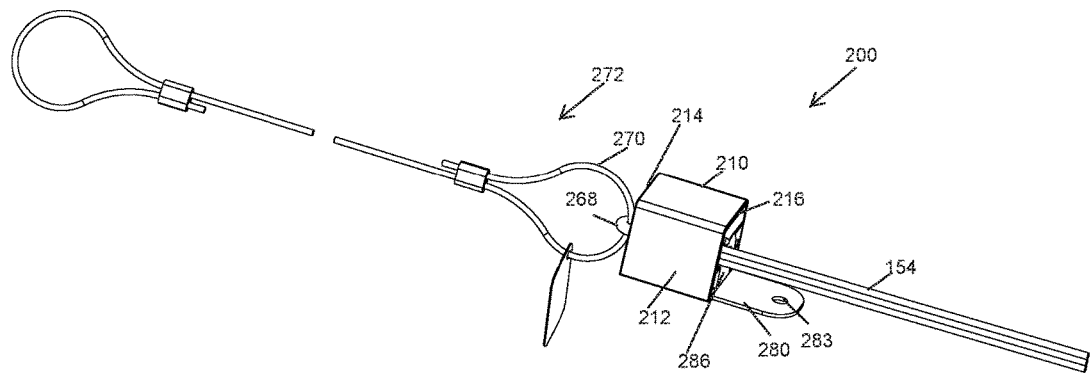
FIG. 6 is an isometric view of a break-away switch assembly
Figure 7:
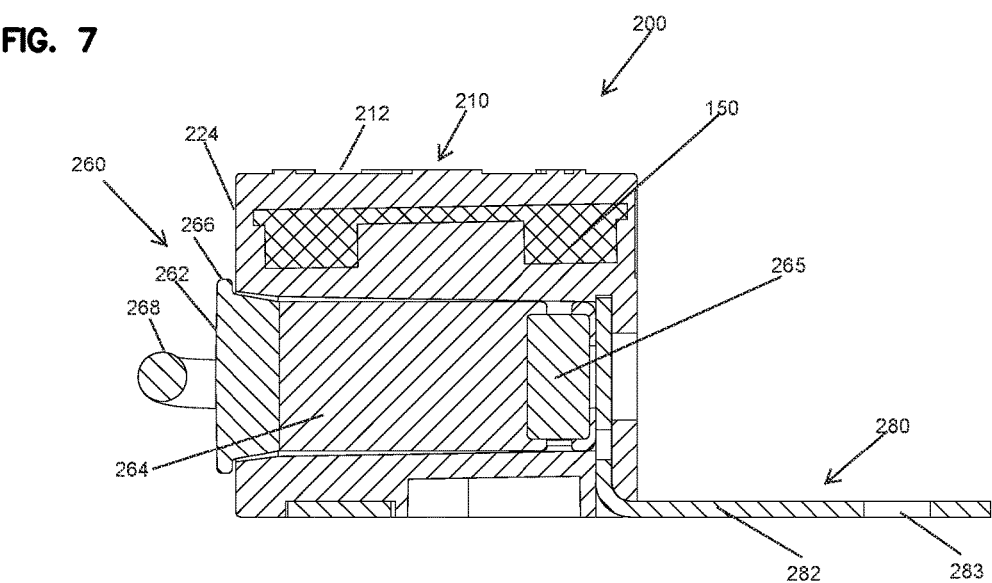
FIG. 7 is a section of view of the break-away switch of FIGS. 6 and 8.
Figure 8:
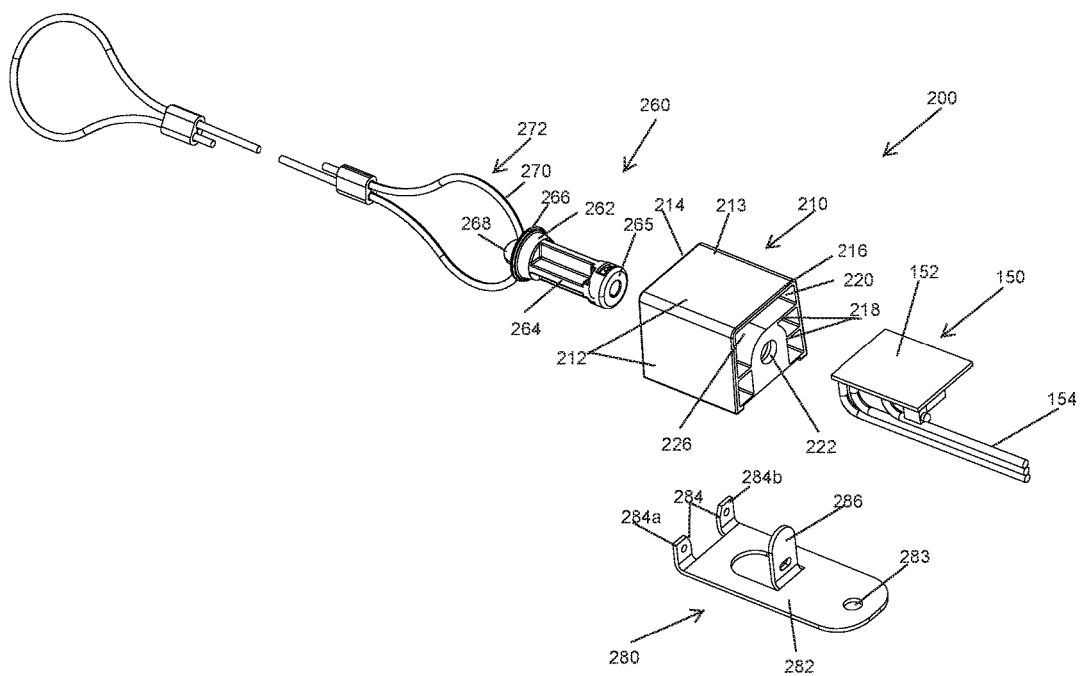
FIG. 8 is an exploded view of a break-away switch assembly.

FIGS. 6-8 illustrate another example configuration of a trailer break-away switch 200. In general, the trailer break-away switch 200 includes a housing portion 210, which is used to house a similar circuit assembly 150, a permanent magnet component 260 and a ferromagnetic bracket 280.

As shown, the housing portion 210 of the trailer break-away switch 200 is generally of a rectangular cross-section including four sides 212 extending from a forward face 214 of the housing portion 210 to a rear face 216 of the housing portion. Each of the four sides 212 presents a solid outer surface 213. Lateral extensions 218 extend from two or more of the inner surfaces 220 of the four sides 212 to support a cylindrical channel structure 222 that extends centrally through the housing portion 210 from the forward face 214 to the rear face 216. A forward face portion 224 substantially encloses the forward face 214 about the open channel structure 222. The lateral extensions 218 of the inner surfaces 220 further define a circuit assembly cavity 226 within the housing portion 210 that is configured to receive and house the electronic circuit assembly 150, described above. The rear face 216 of the housing portion 210 is left open providing assembly access to the channel structure 222 and the circuit assembly cavity 226. It should be noted that while the housing portion 210 has been described as having a rectangular cross-section other cross-section configurations, e.g., square, circular, triangular, hexagonal, etc., may also be used. The channel structure 222 may also comprise a geometrical configuration other than cylindrical. In certain example embodiments, the housing portion 210 is of a unitary construction fabricated through molding of one or more types of polymers.

The permanent magnet component 260 comprises forward portion 262 and a rear portion 264 into which is insert-molded a permanent magnet 265; the permanent magnet component 260 is generally of a cylindrical plug configuration. The rear portion 264 is insertable through the forward face portion 224 of the housing portion 210 and is configured to be received within the channel structure 222. The forward portion 262 includes a lip edge 266 to seal against the forward face portion 224 of the housing portion 210. In certain examples, an o-ring is additionally placed intermediate the lip edge 266 and the forward face portion 224. In still other examples an o-ring can extend about the outer surface of the permanent magnet component 260 at the intersection of the forward portion 262 and rear portion 264. The combined forward portion 262 and rear portion 264 may be of unitary construction or multi-piece construction, and can fabricated through molding of one or more types of polymers. The forward portion 262 of the permanent magnet component 260 is provided with an attachment device 268 configured to receive a loop end 270 of a cable assembly 272. The other end of the cable assembly 272 is coupled to a towing vehicle in such a way as to assure that the permanent magnet component 260 is pulled free from the housing portion 210 in the event of unintended decoupling of a trailer from its towing vehicle.

The ferromagnetic bracket 280 is of a unitary construction having a bottom plate 282 including one or more mounting holes 283, a split forward extending face plate 284 having a first side 284a and a second side 284b, and a forward extending rear plate 286. The first and second sides 284a, 284b of the face plate 284 are positioned to either side of the channel structure 222 in proximity to the forward face portion 224. The rear plate 286 is of a width narrower than the bottom plate 182 but is of sufficient width to cover the channel structure 222 opening at the rear face 216 of the housing portion 210.

Assembly of the trailer break-away switch 200 includes inserting the circuit board 152 and attached wiring 154 into the circuit assembly cavity 226 of the housing portion 210; potting can be used to maintain the desired position of the circuit board 152 as well as seal and protect the circuit board 152 from environmental elements. With the electronic circuit assembly 150 in place, the housing portion 210 can be positioned within the ferromagnetic bracket 280 between the face plate 284 and the rear plate 286. The rear plate 286 generally covers the open channel structure 222 yet provides sufficient space to allow for exit of the attached wiring 154 from the circuit assembly cavity 226. A potting compound can be used to affix one, two or all of the face plate 284, the rear plate 286 and the bottom plate 282 of the bracket 280 to the housing portion 210; other manners (e.g., fasteners, adhesives, etc.) of securing the bracket 280 to the housing portion 210 can also be used as appropriate. In certain examples, the ferromagnetic bracket 280 is insert-molded with the housing portion 210. The rear portion 264 of the permanent magnet component 260 can then be inserted into the channel structure 222 at the opening 288 in the housing portion 210. Complete insertion of the rear portion 264 places the permanent magnet 265 within the permanent magnet component 260 proximate the rear plate 286 of the ferromagnetic bracket 280. The bracket 280 is mountable to the frame, or other component, of a tow trailer via a screw or other fastener inserted through the mounting hole 283; other manners of fastening the bracket 180 to the tow trailer may also be used. The cable assembly 272 is coupled between the permanent magnet component 260 and a tow vehicle.

In operation, with the assembled trailer break-away switch 200 mounted on a towed trailer and coupled via the cable assembly 272 to a tow vehicle, the permanent magnet 265 within the permanent magnet component 260 operates to generate an attractive magnetic force between itself and the rear plate 286 of the ferromagnetic bracket 280 so as to keep the permanent magnet 265 and the ferromagnetic bracket 280 magnetically coupled under normal operation of the switch. More specifically, when the permanent magnet component 260 is inserted in the channel structure 222 of the housing portion 210 and is proximate the ferromagnetic rear plate 286 of the bracket 280, the flux density near the magnetically activated switch U1 is sufficient to activate switch U1 OFF, which opens Q2 between its drain and source. The magnetically activated switch U1 is positioned such that when the permanent magnet component 260 is removed from the housing portion 210, e.g. the trailer being towed by a towing vehicle has become disconnected from the towing vehicle causing the cable assembly 272 and attached permanent magnet component 260 to be pulled free of the housing portion 210, the flux density through the magnetically activated switch U1 is reduced and the magnetically activated switch U1 is turned ON, which turns on Q2 allowing conductivity between the drain and source of Q2. With U1 turned ON, power is provided from the battery, or other power source, to the electric braking circuit of the trailer causing activation of the electric brakes and slowing of the detached trailer. In certain example embodiments, when the magnetically activated switch U1 is turned ON, power can be supplied to not only the electric braking circuit of the trailer but as well to the light emitting diode (LED) D3 for illumination to indicate that +VDC power is connected to the OUTPUT; resistor R4 can be used to limit the current through D3. LED illumination can be used during a test (e.g., pulling the permanent magnet component 260 from the housing portion 210) of the trailer break-away switch 200 to ensure that power is being supplied through the switch 200.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed:

1. A safety switch for attachment to both a towing vehicle and a towed vehicle and operable to change its electrical state in the event that the two vehicles become mechanically decoupled comprising:

first and second relative movable members, said first member being attachable to said towed vehicle and second member comprising two portions, wherein the first of the two portions is ferromagnetic and is removably confined within said first member, and wherein the second of the two portions is flexibly attachable to said towing vehicle;

an electrical circuit, supported by said first member, that creates an electrical switch with use of a magnetically activated device and power field effect transistor such that when a first wire, attached to said electrical circuit is attached to the positive terminal of a power source, a second wire, attached to said electrical circuit, is attached to the negative terminal of said power source and a third wire, connected to said electrical circuit, that electrically disconnects from said first wire forming an open circuit when said second member is confined within said first member and electrically connects said first wire to said third wire when the said second member is removed from said first member;

a permanent magnet supported by said first member that creates a magnetic field which turns on said electrical switch when said second member is removed from said first member and turns off said electrical switch when said second member is inserted into said first member.

2. The switch of claim 1 wherein said permanent magnet holds said second member within said first member.

3. The switch of claim 1 wherein first member includes a ferromagnetic bracket that conducts magnetic flux from said permanent magnet away from magnetically activated device when second member is inserted into said first member.

4. The switch of claim 2 wherein said magnetically activated device is positioned in such a way that a non-ferromagnetic bracket can be used.

5. The switch of claim 1 wherein a sealing device attached to said second member is used to keep environmental contaminants out of a space between the said first member and said second member.

6. The switch of claim 1 wherein the electronic circuit is potted within the housing.

7. The switch of claim 1 wherein a housing boss projecting through bracket hole along with the bracket tab bent to protrude into the potting is use to hold the assembly together.

8. The switch of claim 1 wherein an LED is used to indicate when switch is closed and power is available at the switch output wire.

9. The switch of claim 1, wherein the magnetically activated device comprises a Hall effect sensor switch.

10. The switch in claim 1, wherein the said magnetically activated device comprises a reed switch.

11. A trailer break-away system comprising:
a removable ferromagnetic component;
an electronic circuit assembly comprising a magnetically activated switch, the electronic circuit assembly electrically coupled to a power supply and electrically actuated brake system;
a magnet;
a housing configured to house the removable ferromagnetic component, the electronic circuit, and the magnet, the housing additionally configured to be secured to a trailer that is capable of being hitched to a towing vehicle; and
wherein the magnet is configured to maintain the removable ferromagnetic component within the housing absent application of an external force, the maintenance of the ferromagnetic component within the housing preventing the conduction of electricity through the electronic circuit assembly; and
wherein upon application of an external force sufficient to extract the ferromagnetic component from the housing, the electronic circuit assembly conducts electricity, the electricity activating a braking system of the trailer.

12. The system of claim 11, wherein upon application of an external force sufficient to remove the ferromagnetic component from the housing, the switch conducts electrical power, the electrical power activating a light emitting diode (LED) mounted within the housing.

13. The system of claim 11, wherein the magnetically activated device comprises a Hall effect sensor switch.

14. The system of claim 11, wherein the magnetically activated device comprises a reed switch.

15. The system of claim 11, the system further comprising a cable configured to be coupled between the removable ferromagnetic component and the towing vehicle.

16. The system of claim 11, further comprising a bracket to which the housing is mounted.

17. The system of claim 11, further comprising a sealing device positioned intermediate the removable ferromagnetic component and the housing when the ferromagnetic component is housed within the housing.

18. A safety switch comprising:
a housing including a channel there through;
a magnet maintained within the channel;
a magnetically activated switch, housed within the housing in proximity to the magnet; and
a ferromagnetic component configured to be removably positioned within the channel proximate the magnet,
wherein, when the ferromagnetic component is positioned within the channel a first flux density is generated proximate the magnetically activated switch causing the magnetically activated switch to be in a non-conductive state, and
wherein, when the ferromagnetic component is outside the channel a second flux density is generated proximate the magnetically activated switch causing the magnetically activated switch to be in a conductive state to energize the braking system of a towed vehicle.

19. The safety switch of claim 18, wherein the housing is configured to be mounted on the towed vehicle and wherein the ferromagnetic component is configured to be mechanically coupled to a towing vehicle to which the towed vehicle is hitched, and wherein separation of the towed vehicle from the towing vehicle operates to remove the ferromagnetic component from the channel.

20. A safety switch for attachment to both a towing vehicle and a towed vehicle and operable to change its electrical state in the event that the two vehicles become mechanically decoupled comprising:
first and second relative movable members, said first member being attachable to said towed vehicle and second member comprising two portions, wherein the first of the two portions is magnetic and is removably confined within said first member, and wherein the second of the two portions is flexibly attachable to said towing vehicle;
an electrical circuit, supported by said first member, that creates an electrical switch with use of a magnetically activated device and power field effect transistor such that when a first wire, attached to said electrical circuit is attached to the positive terminal of a power source, a second wire, attached to said electrical circuit, is attached to the negative terminal of said power source and a third wire, connected to said electrical circuit, that electrically disconnects from said first wire forming an open circuit when said second member is confined within said first member and electrically connects said first wire to said third wire when the said second member is removed from said first member;
a permanent magnet supported by said second member that creates a magnetic field which turns on said electrical switch when said second member is removed from said first member and turns off said electrical switch when said second member is inserted into said first member.

21. The switch of claim 20 wherein said permanent magnet, along with a ferromagnetic component in the housing, holds said second member within said first member.

22. The switch of claim 21 wherein said magnetically activated device is positioned in such a way that a non-ferromagnetic bracket can be used.

23. The switch of claim 20 wherein a sealing device attached to said second member is used to keep environmental contaminants out of a space between the said first member and said second member.

24. The switch of claim 20 wherein the electronic circuit is potted within the housing.

25. The switch of claim 20 wherein a housing boss projecting through bracket hole along with the bracket tab bent to protrude into the potting is use to hold the assembly together.

26. The switch of claim 20 wherein an LED is used to indicate when switch is closed and power is available at the switch output wire.

27. The switch of claim 20, wherein the magnetically activated device comprises a Hall effect sensor switch.

28. The switch in claim 20, wherein the said magnetically activated device comprises a reed switch.

29. A trailer break-away system comprising:
a removable magnetic component;
an electronic circuit assembly comprising a magnetically activated switch, the electronic circuit assembly electrically coupled to a power supply and electrically actuated brake system;
a housing configured to house the removable magnetic component, the electronic circuit, and a ferromagnetic component, the housing additionally configured to be secured to a trailer that is capable of being hitched to a towing vehicle; and
wherein the magnet, along with a ferromagnetic component in the housing, is configured to maintain the removable magnetic component within the housing absent application of an external force, the maintenance of the magnetic component within the housing preventing the conduction of electricity through the electronic circuit assembly; and
wherein upon application of an external force sufficient to extract the magnetic component from the housing, the electronic circuit assembly conducts electricity, the electricity activating a braking system of the trailer.

30. The system of claim 29, wherein upon application of an external force sufficient to remove the magnetic component from the housing, the switch conducts electrical power, the electrical power activating a light emitting diode (LED) mounted within the housing.

31. The system of claim 29, wherein the magnetically activated device comprises a Hall effect sensor switch.

32. The system of claim 29, wherein the magnetically activated device comprises a reed switch.

33. The system of claim 29, the system further comprising a cable configured to be coupled between the removable magnetic component and the towing vehicle.

34. The system of claim 29, further comprising a bracket to which the housing is mounted.

35. The system of claim 29, further comprising a sealing device positioned intermediate the removable magnetic component and the housing when the magnetic component is housed within the housing.

36. A safety switch comprising:
a housing including a channel there through;
a ferromagnetic component maintained within the channel;
a magnetically activated switch, housed within the housing in proximity to the ferromagnetic component; and
a magnetic component configured to be removably positioned within the channel proximate the ferromagnetic component,
wherein, when the magnetic component is positioned within the channel a first flux density is generated proximate the magnetically activated switch causing the magnetically activated switch to be in a non-conductive state, and
wherein, when the magnetic component is outside the channel the flux density is removed proximate the magnetically activated switch causing the magnetically activated switch to be in a conductive state to energize the braking system of a towed vehicle.

37. The safety switch of claim 36, wherein the housing is configured to be mounted on the towed vehicle and wherein the magnetic component is configured to be mechanically coupled to a towing vehicle to which the towed vehicle is hitched, and wherein separation of the towed vehicle from the towing vehicle operates to remove the magnetic component from the channel.

* * * * *